(12) United States Patent
Hsieh

(10) Patent No.: US 7,533,281 B2
(45) Date of Patent: May 12, 2009

(54) METHOD AND SYSTEM FOR CONTROLLING POWERS OF A PLURALITY OF SERVERS

(75) Inventor: Chih-tao Hsieh, Taipei (TW)

(73) Assignee: Aten International Co., Ltd., Taipei (TW)

( * ) Notice: Subject to any disclaimer, the term of this patent is extended or adjusted under 35 U.S.C. 154(b) by 532 days.

(21) Appl. No.: 11/195,713

(22) Filed: Aug. 3, 2005

(65) Prior Publication Data

US 2007/0033438 A1 Feb. 8, 2007

(51) Int. Cl.
*G06F 1/00* (2006.01)

(52) U.S. Cl. .................. 713/310; 713/300; 713/320; 713/321; 713/322; 713/323; 713/324; 713/330; 713/340

(58) Field of Classification Search .......... 713/300, 713/310, 320–324, 330, 340; 361/724, 728
See application file for complete search history.

(56) References Cited

U.S. PATENT DOCUMENTS

| 4,769,555 | A | * | 9/1988 | Pequet et al. ............... 307/141 |
| 5,424,903 | A | * | 6/1995 | Schreiber .................... 361/166 |
| 5,450,334 | A | * | 9/1995 | Pulizzi et al. ............... 700/295 |
| 5,923,103 | A | * | 7/1999 | Pulizzi et al. ............... 307/126 |
| 7,234,066 | B2 | * | 6/2007 | Kojo .......................... 713/310 |
| 7,296,172 | B2 | * | 11/2007 | Hsu et al. .................... 713/340 |
| 2003/0126473 | A1 | * | 7/2003 | Maciorowski et al. ...... 713/300 |
| 2004/0148060 | A1 | * | 7/2004 | Lee ............................ 700/295 |
| 2004/0194087 | A1 | * | 9/2004 | Brock et al. ................ 718/100 |

FOREIGN PATENT DOCUMENTS

CN 1696867 A 11/2005

* cited by examiner

*Primary Examiner*—Abdelmoniem Elamin

(57) ABSTRACT

A method and system of controlling powers of a plurality of servers with a power control command mechanism. The system for controlling powers of a plurality of servers compatible with an intelligent platform management interface comprises a console unit, a command mechanism and a plurality of control modules. The console unit generates a request to control a plurality of powers of the servers. The command mechanism coupled to the console unit transforms the request coming from the console unit into a plurality of commands and sends the commands to the servers sequentially; and the control modules coupled to the command mechanism and corresponding to the servers respectively implement the commands to control the powers of the servers sequentially.

19 Claims, 6 Drawing Sheets

METHOD AND SYSTEM FOR CONTROLLING POWERS OF A PLURALITY OF SERVERS

FIELD OF THE INVENTION

The present invention generally relates to a method and system for controlling powers of a plurality of servers, and more particularly to a method and system for controlling powers of a plurality of servers applied for an intelligent platform management interface (IPMI).

BACKGROUND OF THE INVENTION

To process more and more data transmitted via network architecture such as an Internet or local area network, number of servers has been increasingly linked to the network architecture to meet various kinds of functional requirements. Typically, those servers may be set in cluster to share a power source. For specific reason, i.e. a periodic maintenance or incidental troubleshooting, sometimes the users have to firstly shutdown all or part of the servers and then reactivate these servers after the reason is suppressed. Conventionally, a power management unit is applied for managing server powers and substantiated as a hardware device to interconnect a power source and the servers, which is controlled by a remote console through the network architecture whereby the user can conveniently control the power source on demand from a remote console by sending a request to the power management unit, i.e. cutting the power connection between the power source and servers. However, the power management unit is not only expensive for the public but also easily damages the servers with a sudden over-voltage or a current spike resulted from a huge fluctuation of the power source which is directly disconnected with the respective server one by one, by way of a power-control signal generated from the power management unit.

For the above-mentioned problem, an intelligent platform management interface (IPMI) with a management architecture over multi-servers is built up by many manufacturers for compatibility with the products of each other. The architecture is developing with more and more functions. Now it comes out to provide a series of standardized commands, including powering up or down server in the IPMI one by one without usage of any power management unit. Referring to FIG. 1, a conventional method of implementing a power control command in an intelligent platform management interface (IPMI) is showed. In step 102, the user makes a request via a remote console. In step 104, sends out a power control command to the baseboard management controller (BMC). In step 106, the control module receives the command. In step 108, the control module defined in accordance with the IPMI specification, implements the power control command to the server in IPMI, i.e. powering up or down one of the servers. However, to power up or down the numbers of the servers on demands, the user still has to laboriously send each of the different commands corresponded with the servers one by one for many times. For example, if the user wants to power down a hundred of servers, then he has to one by one send all of the power down commands to the hundred servers from the remote console and it would waste lots of time. As aforementioned, either the power management unit solution or the IPMI consideration can only provides a limited capability on power management for the servers. Consequently, it is necessary to develop a management mechanism capable of actively controlling the power of all or part of the servers at proper interval.

SUMMARY OF THE INVENTION

One object of the present invention is to provide a method and system of controlling powers of a plurality of servers to prevent the voltage and current spike resulted from a huge fluctuation of the power source suddenly to damage the servers.

Another object of the present invention is to provide a method and system for controlling powers of a plurality of servers to provide the user with active and convenient power control operation for the servers in cluster.

According to the above objects, the present invention sets forth a method and system for controlling powers of a plurality of servers with a power control command mechanism. The method of performing power control to a plurality of servers having a plurality of controller modules is described below. The user generates a request to control a plurality of powers of the servers via a console unit; a command mechanism transforms the request coming from the console unit into a plurality of commands and sends out the commands to the controller modules of the servers by the command mechanism sequentially; and the control modules implement the commands to control the powers of the servers sequentially; furthermore, the control modules forward responding signals corresponding to the commands into the console unit via the command mechanism.

The system for controlling powers of a plurality of servers compatible with an intelligent platform management interface comprises a console unit, a command mechanism and a plurality of control modules. The console unit generates a request to control a plurality of powers of the servers. The command mechanism coupled to the console unit transforms the request coming from the console unit into a plurality of commands and sends the commands to the servers sequentially; and the control modules coupled to the command mechanism and corresponding to the servers respectively implement the commands to control the powers of the servers sequentially.

The advantages of the proposed scheme for controlling powers of a plurality of servers is the authority to control the powers of all or part of the servers in cluster willfully and prevention of the over-voltage or a current spike resulted from a huge fluctuation of the power source suddenly to damage the servers.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings, wherein.

DETAILED DESCRIPTION OF THE PREFERRED EMBODIMENTS

Figure 1:
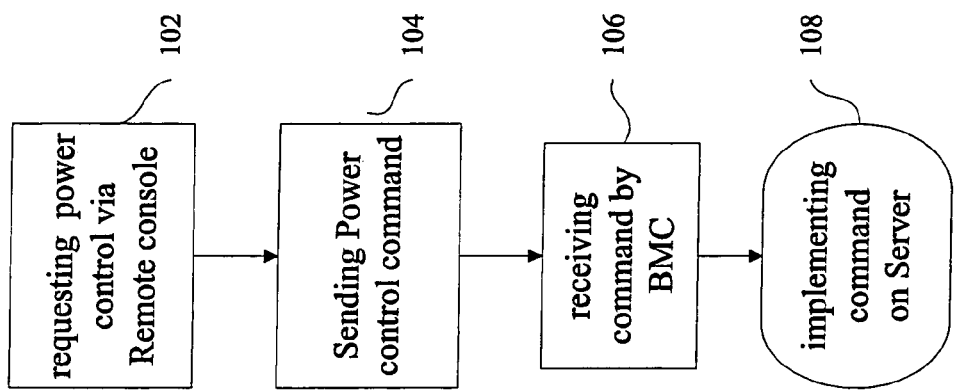
FIG. 1 shows a conventional method to control power of a server via BMC.
Figure 2:
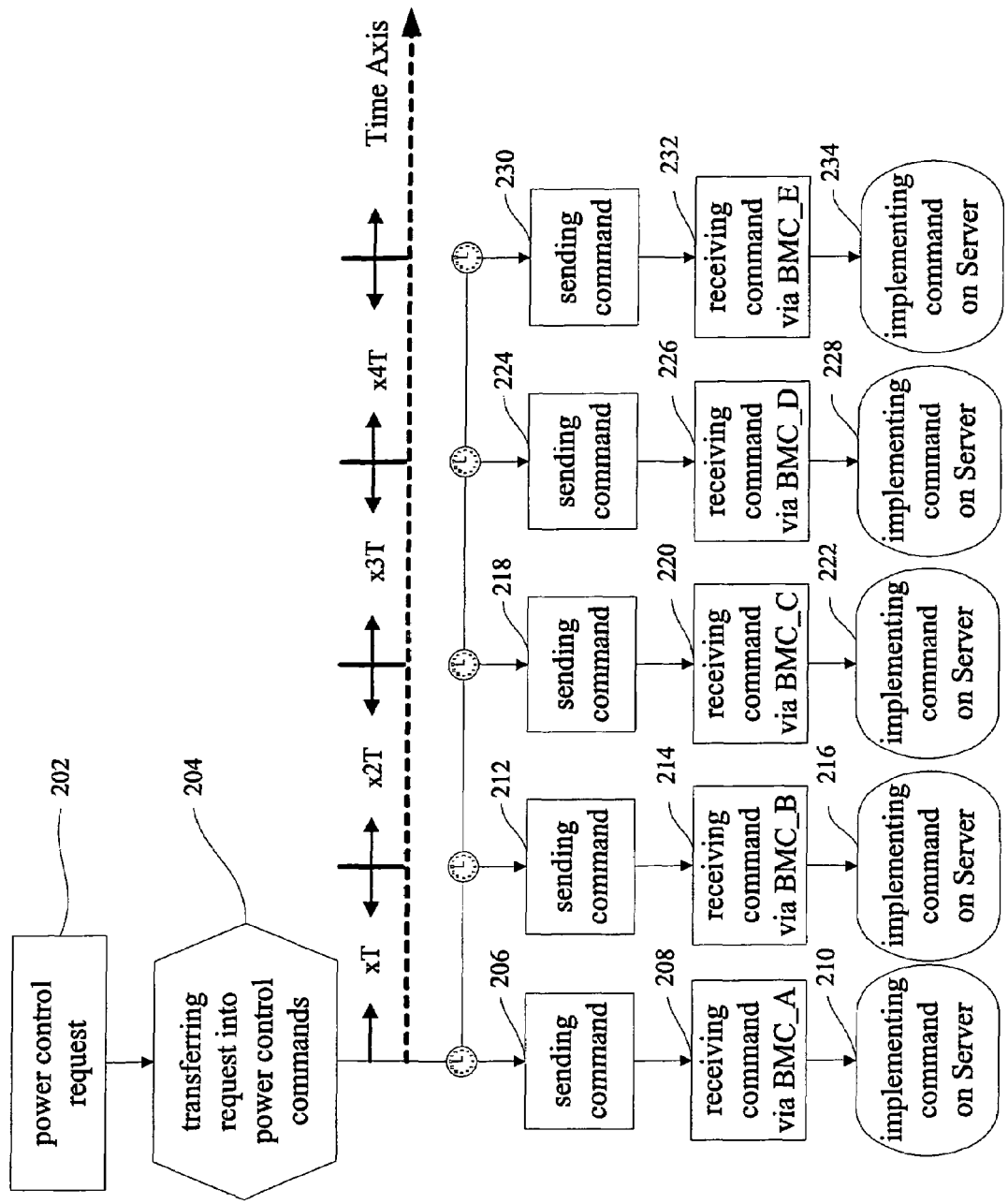
FIG. 2 shows a flowchart of a method and process of power control a plurality of servers in a time axis according to the present invention.

Referring to FIG. 2, a flow chart of a method according to the present invention for controlling powers of a plurality of servers from a remote console unit is shown in a time axis, relied upon an intelligent platform management interface (IPMI). The plurality of servers respectively has a plurality of controller modules. The method comprises the following steps In step 202, generating a power control request (i.e. powering up or down) from a console unit to control powers of a plurality of servers in sequences;

In step 204, transforming the power control request into a plurality of corresponding power control commands by a command mechanism;

In each steps 206, 212, 218, 224, 230, sequentially sending each of the power control commands to the corresponding servers in compliance with each of several predetermined intervals (xT, x2T, x3T, x4T . . . ) along a time axis, respectively;

In steps 208, 214, 220, 226, 232, sequentially and respectively receiving the power control commands from the BMCs A~E of the servers; and In steps 210, 216, 222, 228, 234, sequentially implementing each of the power control commands on the corresponding servers.

Specifically, via intervals xT, x2T, x3T, x4T, the power controls for the servers will be separated away, which is beneficial to prevent the servers from damage of the sudden over-voltage or a current spike due to a huge fluctuation on the power source, resulted from simultaneously powering up or down the specific servers.

Figure 3A:
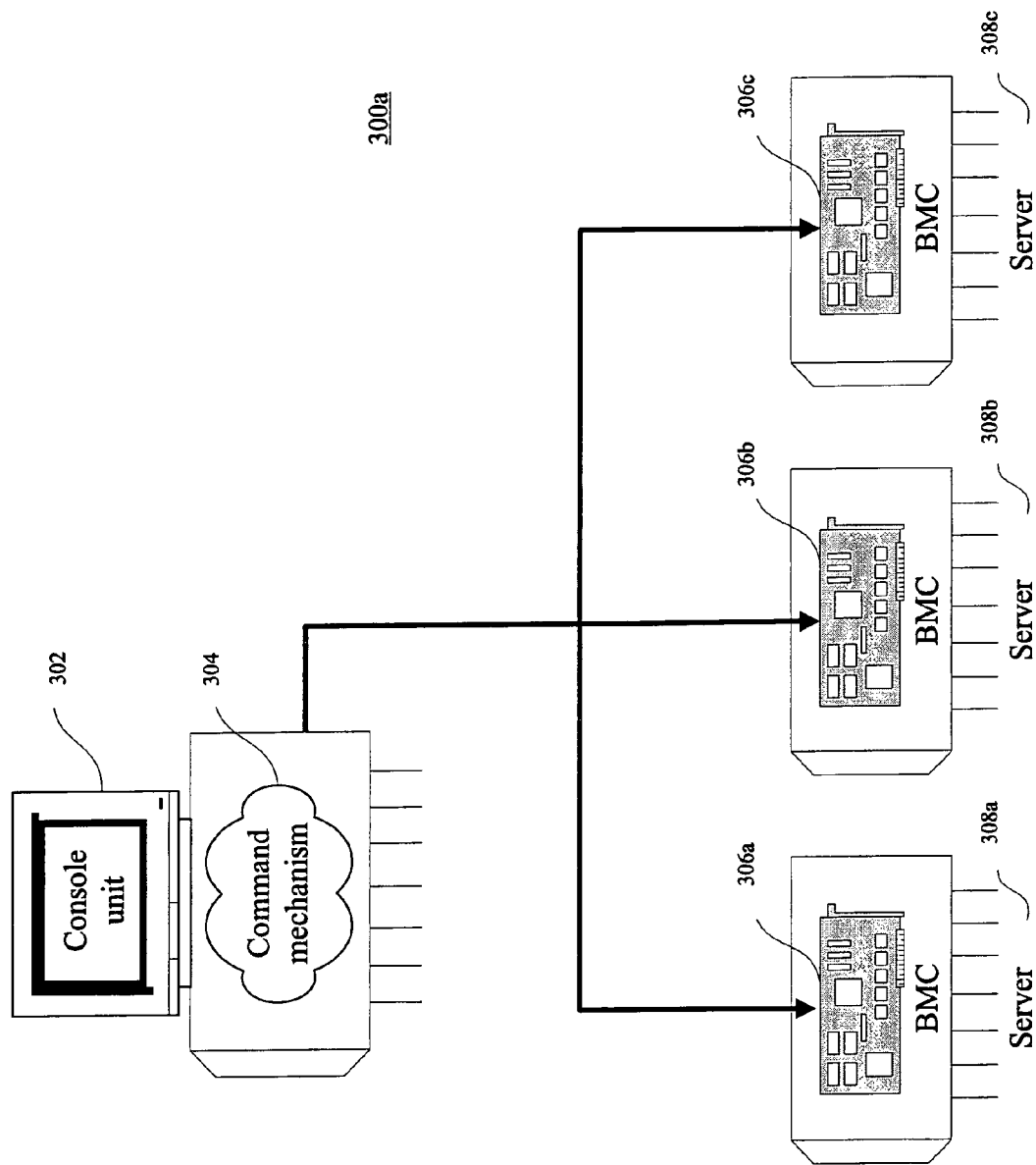
FIG. 3A illustrates one embodiment of the simple network structure of the console and a plurality of servers according to the present invention.

FIG. 3A illustrates a system 300a according to a first embodiment of the present invention for controlling powers of a plurality of IPMI-enabled servers 308a, 308b, 308c, compatible with an intelligent platform management interface (IPMI), via a simple network structure, which includes a console unit 302, a command mechanism 304, a plurality of control modules as baseboard management controllers (BMCs) 306a, 306b, 306c. Meanwhile, the console unit 302 only generates a power control request (i.e. powering down or up) to control a plurality of powers of the specific servers 308a, 308b, 308c, in sequence on demand of the user. In the first embodiment, the command mechanism 304 can be a part of an IPMI management software disposed within the console unit 302 and linked to the BMCs 306a, 306b, 306c of the server 308a, 308b, 308c through a network, such as a LAN or the Internet, respectively. The command mechanism 304 is used to transform the power control request from the console unit 302 into a plurality of power control commands and then sequentially sends the commands to the desired or the specific servers in a predetermined interval in accordance with the request. The BMCs 306a, 306b, 306c as the control modules coupled to the command mechanism and the servers respectively implements the commands to shut down the specific servers, sequentially. That is, via the present invention, the servers will not be shut down simultaneously and thus damage to the servers caused by sudden over-voltage or a current spike. Since the console unit 302, the command mechanism 304 and the BMCs 306a, 306b, 306c of the specific servers 308a, 308b, 308c are linked through the network, each of the specific servers 308a, 308b, 308c, certainly is assigned with a corresponding IP address indicating uniqueness. Although FIG. 3A shows only three servers, the present invention does not restrict the number of the servers that can implement the present method. Oppositely, a power of only a part of the specific servers may be selectively controlled by the user in a next procedure.

Figure 3B:
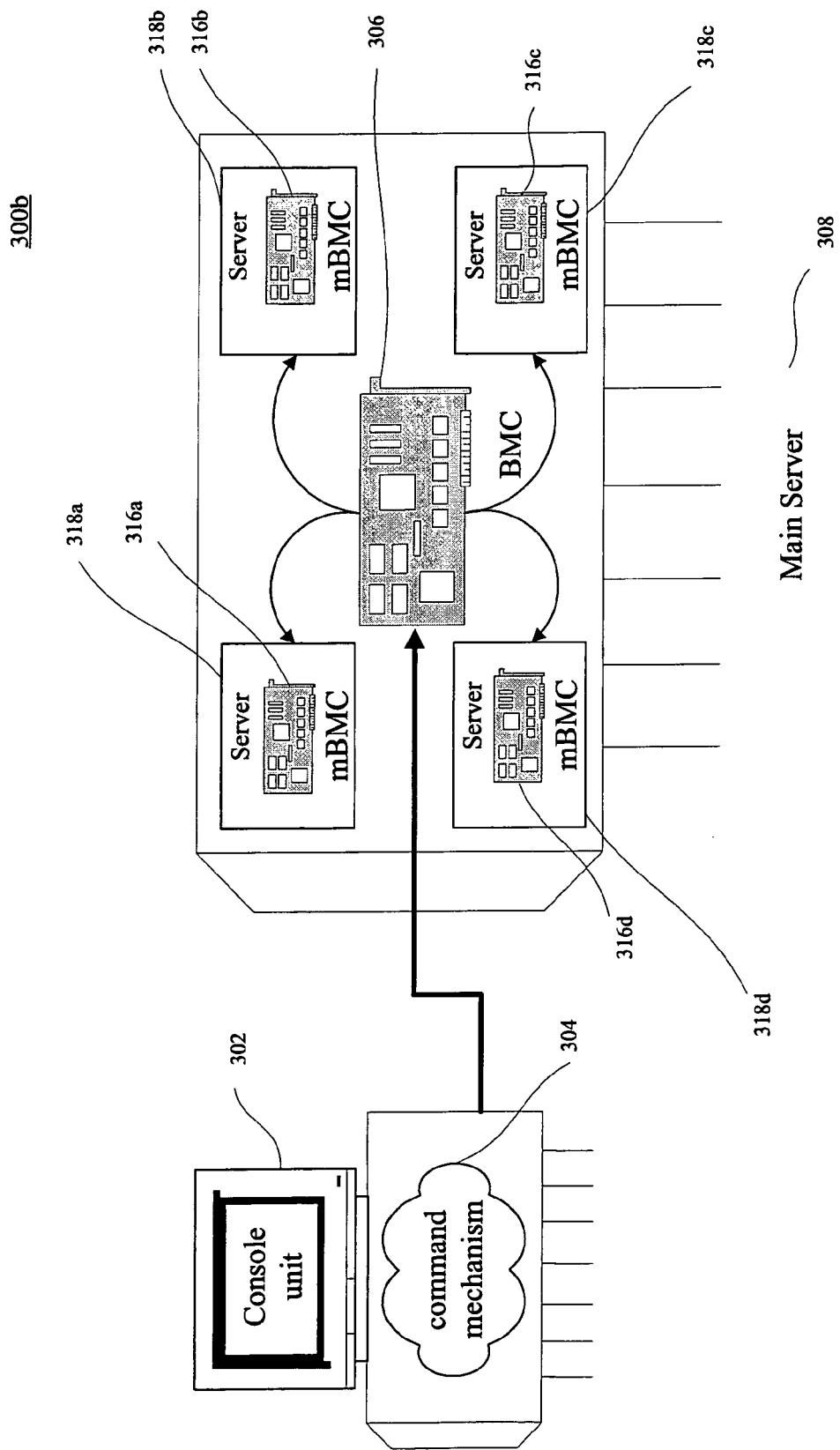
FIG. 3B illustrates another embodiment of the simple network structure of the console and a plurality of servers according to the present invention.

FIG. 3B illustrates a system 300b according to a second embodiment of the present invention for controlling powers of a main server 308 and a plurality of servers 318a, 318b, 318c, 318d, all compatible with an intelligent platform management interface (IPMI) via a network, which includes a console unit 302, a command mechanism 304, a BMC 306, a plurality of control modules as mBMCs (it means "mini-BMC") 316a, 316b, 316c, 316d. The MBMC is a simplified BMC. The mBMC's functions are almost similar to BMC but fewer i.e. the mBMC can not communicate with Internet Protocol. Meanwhile, the console unit 300 only generates a power control request (i.e. powering down or up) to control a plurality of powers of the main server 308 and the specific servers 318a, 318b, 318c, 318d in sequence on demand of the user. In this second embodiment, the command mechanism 304 is still disposed within the console unit 302 but only directly linked to the BMC 306 of the main server 308 through a network, such as a LAN or the Internet, for communication with the console unit 302. And, the mBMCs 316a, 316b, 316c, 316d are coupled with the BMC 306 of the main server 308 by a SMBus (System Management Bus). Besides, the main server 308 is still assigned with only one IP address but the other servers with mBMC 318a, 318b, 318c, 318d are respectively assigned with fictitious ones. For compatibility with the servers the 318a, 318b, 318c, 318d, both the BMC 306 and mBMCs 316a, 316b, 316c, 316d comply with IPMI specification. The command mechanism 304 is used to transform the power control request from the console unit 302 into a plurality of power control commands and then sequentially sends the commands to the BMC 306 of the main server 308. Then, the BMC 306 respectively and sequentially transmits the plurality of power control commands to the specific servers 318a, 318b, 318c, 318d via SMBus, according to a predetermined interval described in FIG. 2. Any one of the mBMCs 316a, 316b, 316c, 316d as the control modules implement the commands received from the main server 308 on the specific servers 318a, 318b, 318c, 318d to shut down or up the specific servers, sequentially. In an illustration, the main server 308 applied with mBMCs might be a high-density integrated Blade Server, which was produced by known I.T factories e.g. IBM, Intel, HP . . . etc.

Figure 4:
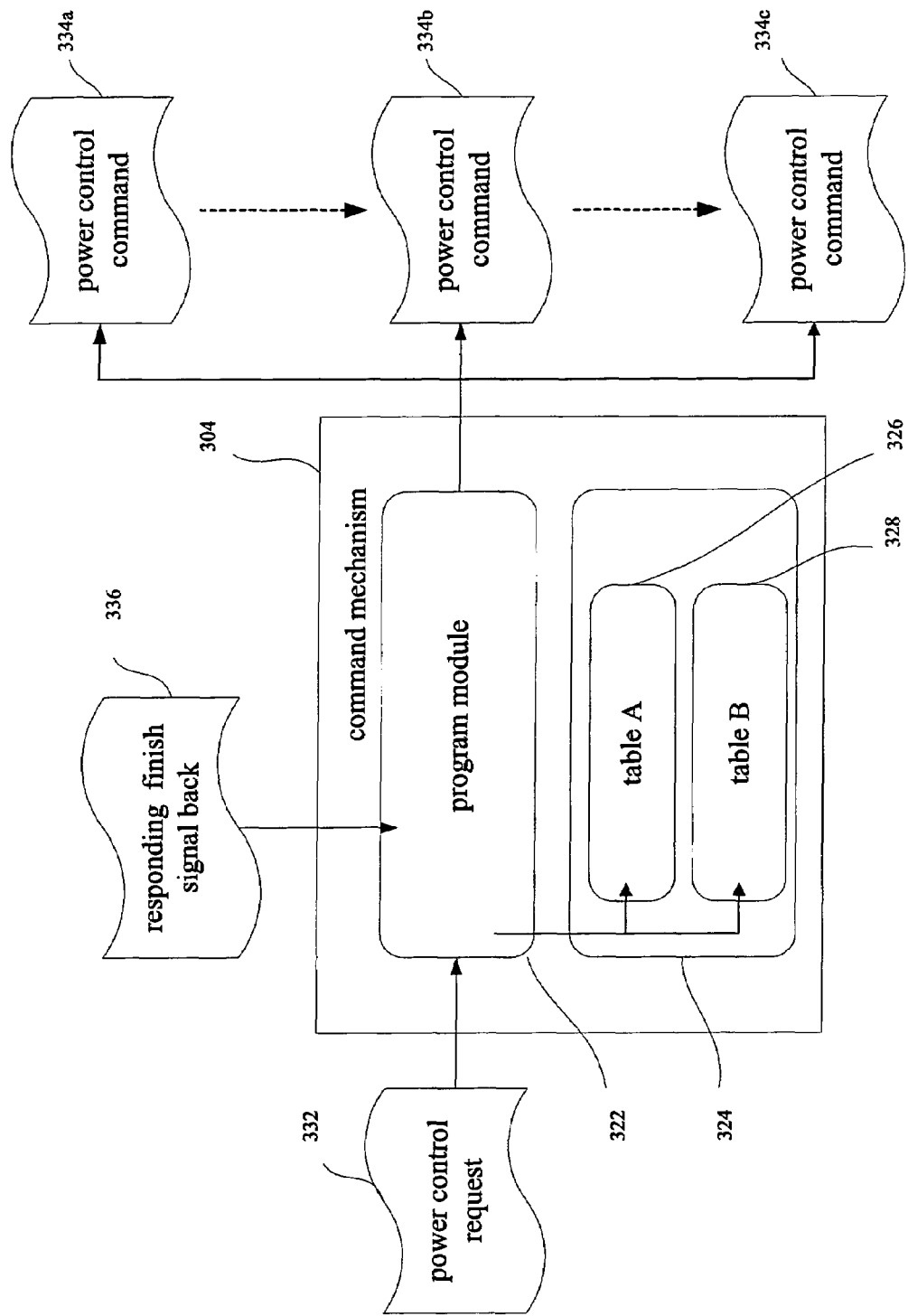
FIG. 4 illustrates a detailed block diagram of the command mechanism implemented in the system for power control a plurality of servers of the present invention.

FIG. 4 illustrates a detailed block diagram of the command mechanism 304 implemented in the system shown in FIGS. 3A and 3B including a program module 322 and an order table 324. The order table 324 is defined with a table A 326 and a table B 328 wherein the program module 322 receives the power control request 332 from the console unit and transforms the power control request 332 into the power control commands 334a, 334b, 334c. Furthermore, the program module 322 accesses an order information from the tables A, B of the order table. The table A 326 records a plurality of Internet Protocol addresses respectively assigned to the specific servers and the table B records a plurality of serial numbers assigned to the same servers. The order information indicates either the IP addresses, the serial numbers or both for the specific servers, with an order or with a random sequence. According to the order information, the command mechanism 304 sends the power control commands 334a, 334b, 334c, to the control modules corresponding to the specific servers, respectively. From control modules, such as a BMC shown in FIG. 3A or FIG. 3B, the power control commands 334a, 334b, 334c to control the powers of the servers sequentially are implemented. Thereafter, each of the control modules forwards a responding signal back, as a step 336.

Figure 5:
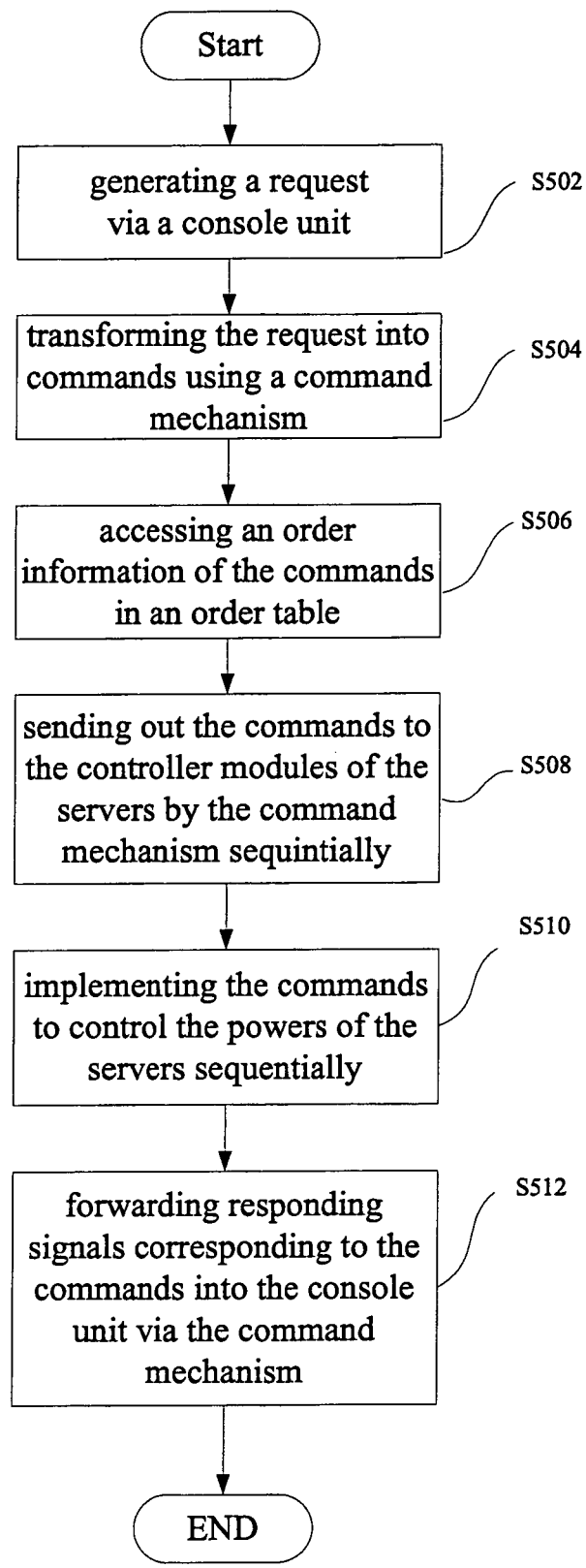
FIG. 5 shows a flowchart of performing a request from console to control powers of a plurality of servers having a plurality of controller modules according to the present invention.

Further referring to FIG. 5, a flowchart of controlling powers of a plurality of servers having a plurality of controller modules (i.e. BMCs) according to the present invention is presented below.

In step S502, the user generates a request to control a plurality of powers of the specific servers via a console unit.

In step S504, a command mechanism transforms the request received from the console unit into a plurality of power control commands.

In step S506, a program module accesses an order information from an order table including two tables A and B, wherein the table A records a plurality of Internet Protocol addresses respectively assigned to the specific servers, and the table B records a plurality of serial numbers assigned to the same servers.

In step S508, the command mechanism sends out the power control commands to the controller modules of the servers sequentially. In step S510, The control modules of servers implement the commands to control the powers of the servers sequentially. In step S512, the control modules forward a plurality of responding signals corresponding to the commands to the console unit via the command mechanism.

In conclusion, the advantages of the proposed method and system, according to the present invention, is to prevent the over-voltage or a current spike resulted from a huge fluctuation of the power source suddenly to damage the servers and to provide the user with active and convenient power control operation for the servers in cluster.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method of power down a plurality of servers having a plurality of controller modules with intelligent platform management interface, the method comprising the steps of:
   generating a request to control a plurality of powers of the servers via a console unit;
   transforming the request from the console unit into a plurality of commands using a command mechanism;
   sending out the commands to the controller modules of the servers by the command mechanism sequentially; and
   implementing the commands to shut down the servers sequentially.

2. The method of claim 1, after the step of transforming the request into the commands, further comprising accessing an order information of the commands in an order table.

3. The method of claim 2, wherein the order information within the order table comprises a plurality of Internet Protocol addresses assigned to the servers.

4. The method of claim 2, wherein the order information within the order table comprises a plurality of serial numbers assigned to the servers.

5. The method of claim 2, wherein the order information of the order table is a random sequence for sending out the commands to the control modules.

6. The method of claim 1, after the step of implementing the commands to shut down the servers sequentially, further comprising forwarding a plurality of responding signals corresponding to the commands into the console unit via the command mechanism.

7. A method of controlling a plurality of servers having a plurality of controller modules with intelligent platform management interface, the method comprising the steps of:
   generating a request to control a plurality of powers of the servers via a console unit;
   transforming the request from the console unit into a plurality of commands using a command mechanism;
   sending out the commands to the controller modules of the servers by the command mechanism sequentially; and
   implementing the commands to control the powers of the servers sequentially.

8. The method of claim 7, after the step of transforming the request into a plurality of commands, further comprising accessing an order information of the commands in an order table.

9. The method of claim 8, wherein the order information within the order table comprises a plurality of Internet Protocol addresses assigned to the servers.

10. The method of claim 8, wherein the order information within the order table comprises a plurality of serial numbers assigned to the servers.

11. The method of claim 8, wherein the order information of the order table is a random sequence for sending out the commands to the control modules.

12. The method of claim 7, after the step of implementing the commands to control the servers sequentially, further comprising forwarding a plurality of responding signals corresponding to the commands into the console unit via the command mechanism.

13. A system for controlling power of a plurality of servers compatible with an intelligent platform management interface, the system comprising:
   a console unit, generating a request to control a plurality of powers of the servers;
   a command mechanism coupled to the console unit, transforming the request from the console unit into a plurality of commands and sending the commands to the servers sequentially; and
   a plurality of control modules coupled to the command mechanism and corresponding to the servers, respectively, implementing the commands to shut down the servers sequentially.

14. The system for power down the servers of claim 13, wherein at least one of the controller modules is baseboard management controller while the rest are mini-baseboard management controllers.

15. The system for power down the servers of claim 14, further comprising an order table in the command mechanism to access the order information of the commands corresponding to the servers.

16. The system for power down the servers of claim 15, wherein the order information within the order table comprises a plurality of Internet Protocol addresses assigned to the servers.

17. The system for power down the servers of claim 16, wherein the order information within the order table comprises a plurality of serial numbers assigned to the servers.

18. The system for power down the servers of claim 17, wherein the order information of the order table is a random sequence for sending out the commands to the control modules.

19. The system for power down the servers of claim 13, wherein the control modules forward a plurality of responding signals corresponding to the commands into the console unit via the command mechanism after implementing the commands to shut down the servers sequentially.

* * * * *